United States Patent [19]

Mumford

[11] Patent Number: 4,529,431
[45] Date of Patent: Jul. 16, 1985

[54] MULTIPLE GOB DELIVERY AND REJECT MECHANISM

[75] Inventor: Eustace H. Mumford, Ottawa Lake, Mich.

[73] Assignee: Owens-Illinois, Inc., Toledo, Ohio

[21] Appl. No.: 546,695

[22] Filed: Oct. 28, 1983

[51] Int. Cl.³ .............................................. C03B 7/16
[52] U.S. Cl. ......................................... 65/225; 65/304
[58] Field of Search ................. 65/165, 207, 221, 225, 65/304; 425/145; 193/22, 23

[56] References Cited

U.S. PATENT DOCUMENTS

| Re. 28,073 | 7/1974 | Trudeau | 65/225 |
| 1,575,370 | 3/1926 | Lorenz | 65/165 |
| 2,267,236 | 12/1941 | Goodrich | 65/165 |
| 2,984,047 | 5/1961 | Mennitt et al. | 65/165 |
| 3,341,315 | 9/1967 | Patschorke | 65/304 |
| 3,594,146 | 7/1971 | Trudeau | 65/164 |
| 3,721,544 | 3/1973 | Bystrianyk et al. | 65/225 |

Primary Examiner—S. Leon Bashore
Assistant Examiner—Michael K. Boyer
Attorney, Agent, or Firm—John R. Nelson

[57] ABSTRACT

There is disclosed a system for delivering gobs to a plural section glass forming machine in which an oscillating scoop distributes the gobs not only to the machine sections but also, on command to the servo motor drive for the scoop, to a delivery trough extending to a cullet chute. The chute may be behind the machine or in front. When it is desired to reject gobs from a section, the command is given to the motor control, which will index the scoop to the reject position instead of to the section so that it may be taken out of service.

6 Claims, 6 Drawing Figures

MULTIPLE GOB DELIVERY AND REJECT MECHANISM

BACKGROUND OF THE INVENTION

In the feeding of multiple gobs to plural section glass forming machines, particularly the widely used I.S. or independent section type, the delivery of the gobs has in the past been through a plurality of individual funnel and deflector mechanisms. A more recent development is the use of an oscillating gob distributor in the form of a downwardly and outwardly extending chute positioned beneath the guide funnel and ahead of the troughs leading to the forming machine sections. U.S. Pat. No. Re. 28,073 to U. P. Trudeau, dated July 9, 1974 and of common assignee to the present case, illustrates a double gob distributing arrangement where a pair of deflector scoops are positioned beneath a double gob orifice feeder and the scoops or deflectors are indexed such that their delivery ends align themselves with the plural sets of troughs leading to the individual machine sections. As long as the machines are operating in satisfactory manner and there is no necessity or desire to put one of the sections out of service to either replace a mold or to adjust a machine which is producing a defective container, the machine will operate satisfactorily. However, when it becomes desirable to take a section out of operation, it is necessary to deflect the gobs before they drop into the chutes, or into the scoops, away from the troughs, or in some way provide a way of intercepting the gobs prior to their arrival at the individual machine section. On occasion, it is also desirable to shut down the entire machine and all of its sections, at which time all of the gobs will necessarily be sent to a cullet accumulating area normally found in the basement of the factory.

A system for providing rejection of gobs as they are being fed to the upper end of an oscillating scoop is shown in U.S. Pat. No. 3,594,146, issued July 20, 1971. In this patent, there is shown a vertical funnel positioned beneath the feeder orifice, and the funnel is mounted such that it may be oscillated to throw a gob out of the vertical path of travel through the funnel by oscillation of the funnel. The system is such that it may be programmed to operate on a particular section and to deflect gobs destined for that section away from the distributor. Furthermore, there is shown an arrangement where all of the gobs to the full machine may be intercepted by the movement of a cullet chute into the area between the lower end of the funnel and the upper end of the distributor scoop. In this situation, it is perhaps better that the guide funnel itself be shifted out of the path permitting the gob of molten glass to fall directly into the positioned cullet chute, preserving the integrity of the funnel and avoiding excessive wear thereof.

SUMMARY OF THE INVENTION

Apparatus for simultaneously distributing plural gobs of molten glass to plural cavities of a plurality of forming machine sections positioned therebelow, wherein a set of oscillating scoops are positioned to receive the gobs as they fall from the feeder, and to distribute the gobs to a plurality of sets of troughs which extend from the scoop swing area to the forming molds and to a cullet chute, with control means connected to the drive motor for driving the scoops into alignment with the sets of troughs in a predetermined pattern, and upon injection of a reject signal for any section, to position the troughs to deliver the gobs to the cullet chutes.

DETAILED DESCRIPTION OF THE DRAWINGS

Figure 1:
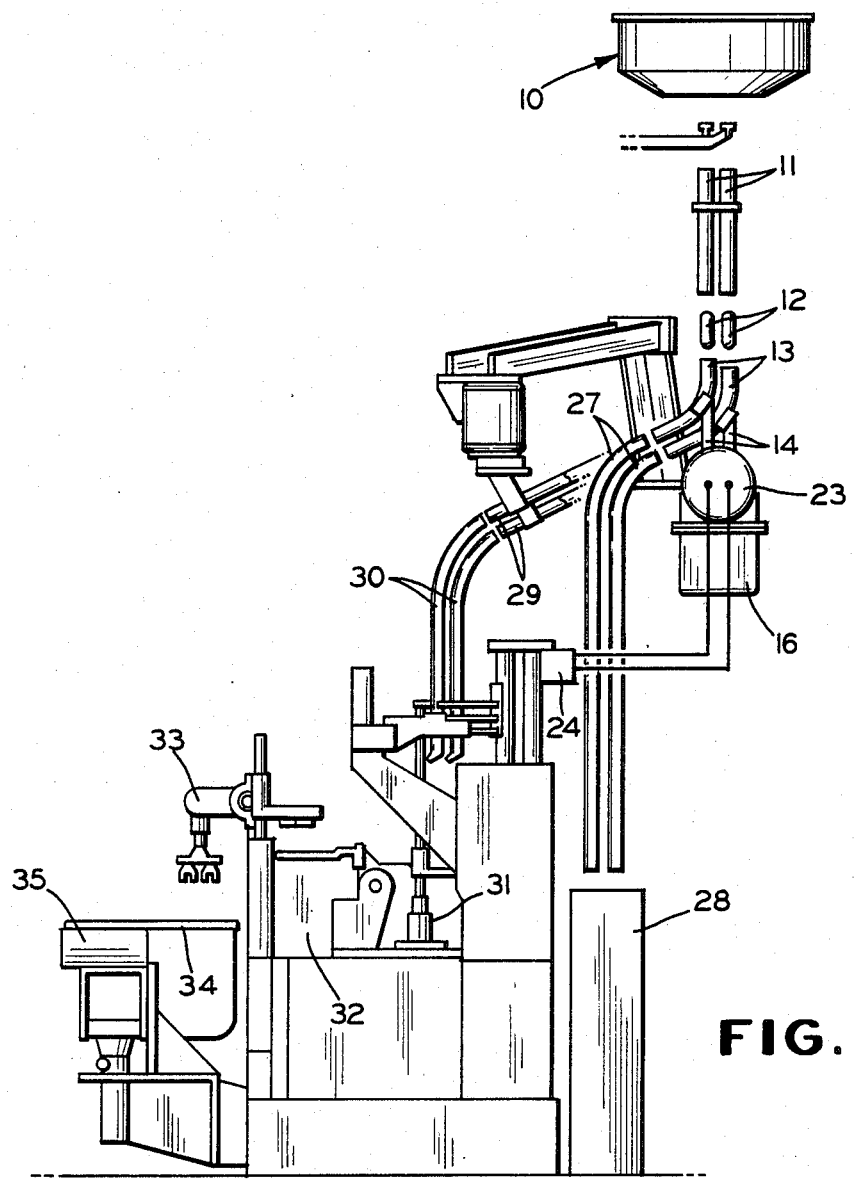
FIG. 1 is a side elevational view of a glass forming machine and gob delivery system illustrating the invention.
Figure 5:
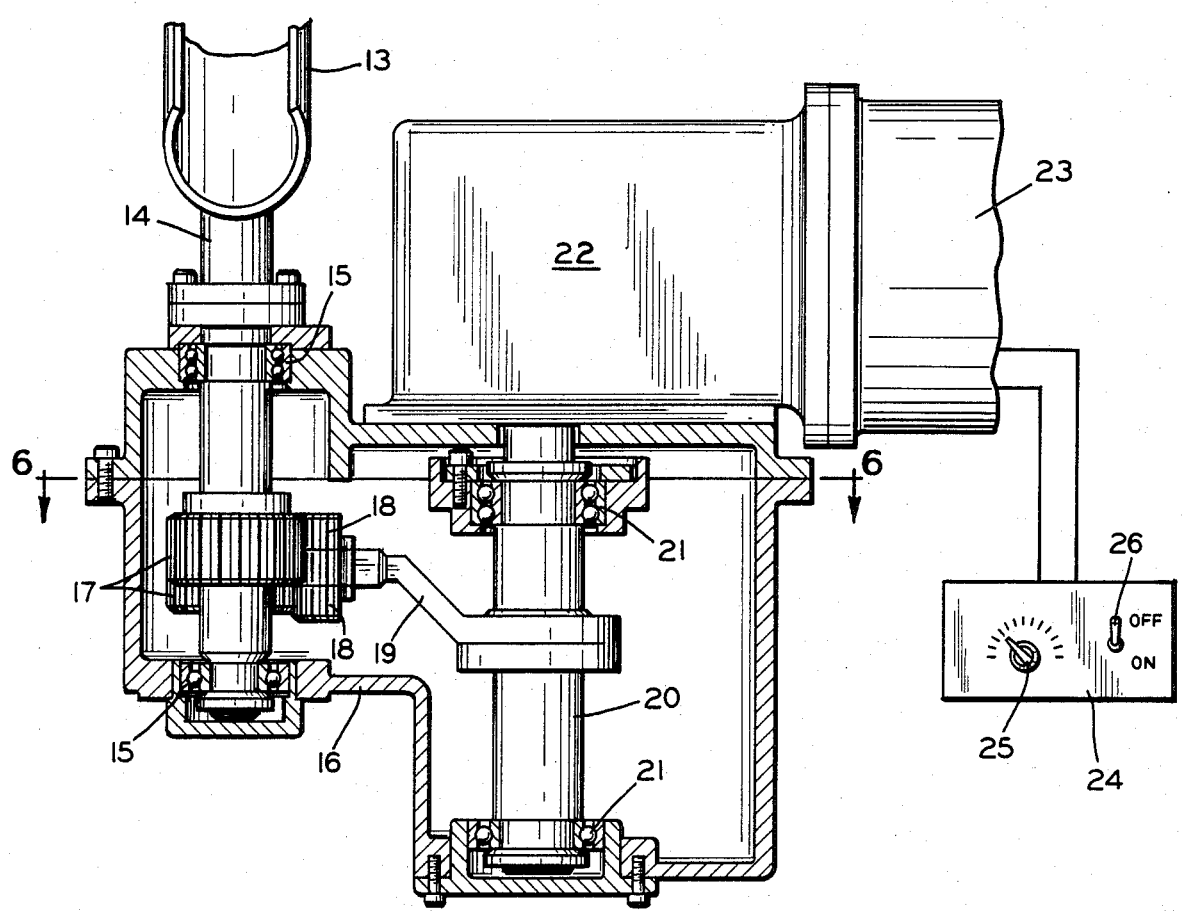
FIG. 5 is a side elevational view of the drive mechanism for the scoop with the near side cover thereof removed.
Figure 6:
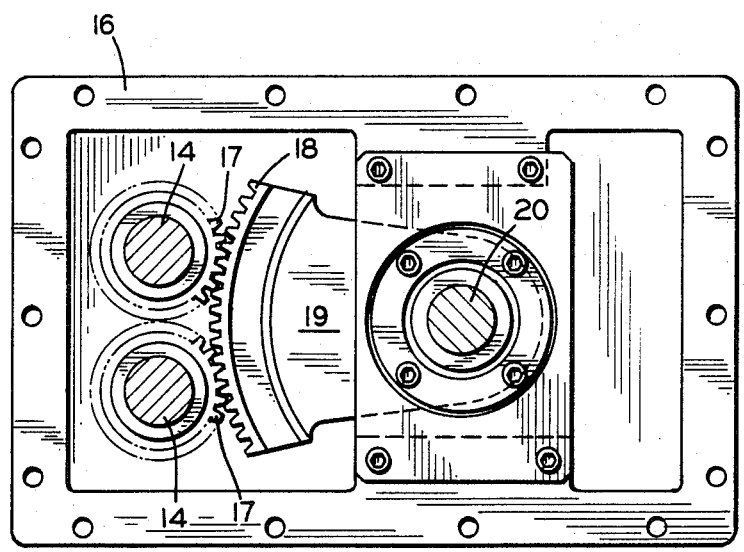
FIG. 6 is a cross-sectional view taken at line 6—6 of FIG. 5.

With particular reference to FIG. 1, there is schematically shown in generally side elevational view an I.S. type forming machine in which a feeder bowl 10 having a pair of lower outlet orifices through which the molten glass may flow into a pair of guide funnels 11. The funnels 11 are coaxial with respect to the orifices in the bottom of the feeder bowl and, as shown in FIG. 1, a pair of gobs 12 have left the funnels and are about to enter the upper end of a pair of deflector scoops 13. Each deflector scoop is mounted on a vertical shaft, as shown in the above cited U.S. Pat. No. Re. 28,073, it being understood that the most forward scoop will be mounted on a yoke, which in turn is carried by the shaft. The shafts 14, as perhaps best shown in FIGS. 5 and 6, are mounted for rotation in bearings 15 in a support housing 16. Each shaft 14 has a spur gear 17 fixed thereto. The spur gears 17 are driven by engagement with a pair of sector gears 18, which are carried at the extending end of an arm 19. The arm 19 is fixed to a vertical shaft 20, which also is mounted for rotation in the housing 16 by bearings 21. Above the housing 16 is mounted a gear box 22, with the shaft 20 being the output shaft from this gear box 22. The gear box 22 is driven by a servo motor 23. The servo motor 23 is electrically connected to a control system 24, which may be provided with a selector switch 25 and an on-off switch 26. The selector switch 25 may be provided with six positions which would correspond to the six individual sections of the machine, although there could be as many as ten sections, in which case the switch would have more positions. Thus it can be any one of the six sections to which it is desired not to feed gobs that may be selected. A seventh switch can be provided,or a seventh position, which will effect the reject of gobs from the feeder in respect to all of the sections when it is desired to shut down the entire machine. The servo motor 23, through the control device 24, is programmed so as to follow a preset pattern of delivery, such as that shown in U.S. Pat. No. Re. 28,073, or may be easily reprogrammed to change the firing order to a different selected firing order, it being understood that the firing order may be different for different types of glassware being made on the machine. However, normally, once the firing order is selected, it is maintained. It should be understood that the gob distributors or scoops are moved in unison by the motor 23 to index the delivery ends of the scoops to deliver gobs to the individual section parison molds.

With reference to FIG. 1, which shows one embodiment of the invention, the lower ends of the gob distributors 13 are shown in alignment with a pair of deflector chutes 27, whose lower ends open into the upper end of a cullet chute 28. The cullet chute is normally positioned above a gob reject receiving bin located beneath the floor of the factory and frequently is a water-cooled receiver.

Figure 2:
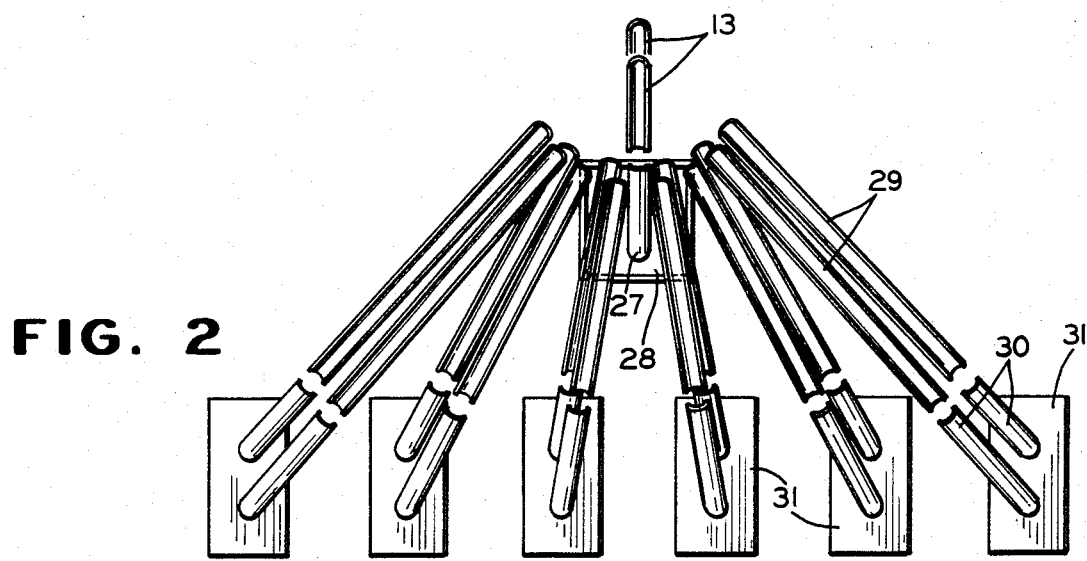
FIG. 2 is a schematic plan view of the apparatus as shown in FIG. 1 on a somewhat enlarged scale.

As shown in FIG. 2, the deflector chutes 27 are in a position such that they will receive the gobs as they exit from the deflector scoops 13. However, this occurs only at that point in time when a particular pair of gobs are to be rejected from the machine, and during normal operations of the servo motor 23, the deflector scoops 13 will deliver mold charges or gobs to pairs of troughs 29. The outlet end of the troughs 29 are in alignment with the receiving ends of deflectors 30, whose lower ends are in vertical alignment with parison molds 31 in the forming machine sections. The lower ends of the deflectors 30 may actually be elongated guide funnels to accurately position the gobs centrally of the cavities in the parison molds 31. After the parisons are formed in the parison molds 31, they are transferred by their necks to blow molds 32, and then are taken from the blow molds by takeout mechanisms 33 to place the bottles in a vertical upright position on a cooling deadplate 34. The bottles are then swept from the deadplate 34 onto the top of a moving belt conveyor 35, which carries the formed ware away from the forming area.

In the embodiments shown in FIGS. 1 and 2, the cullet chute 28 is positioned beneath the feeder mechanism and in effect is behind the machine section.

Figure 3:
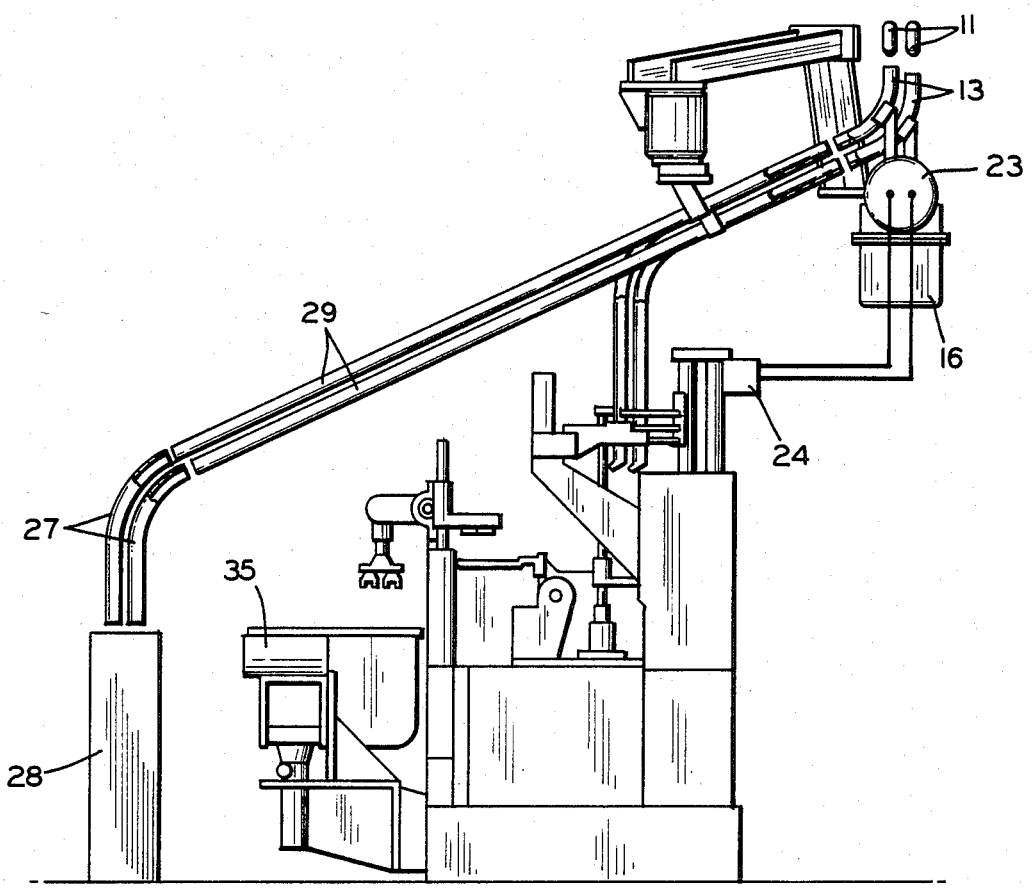
FIG. 3 is a side elevational view of a second embodiment of the apparatus of the invention.
Figure 4:
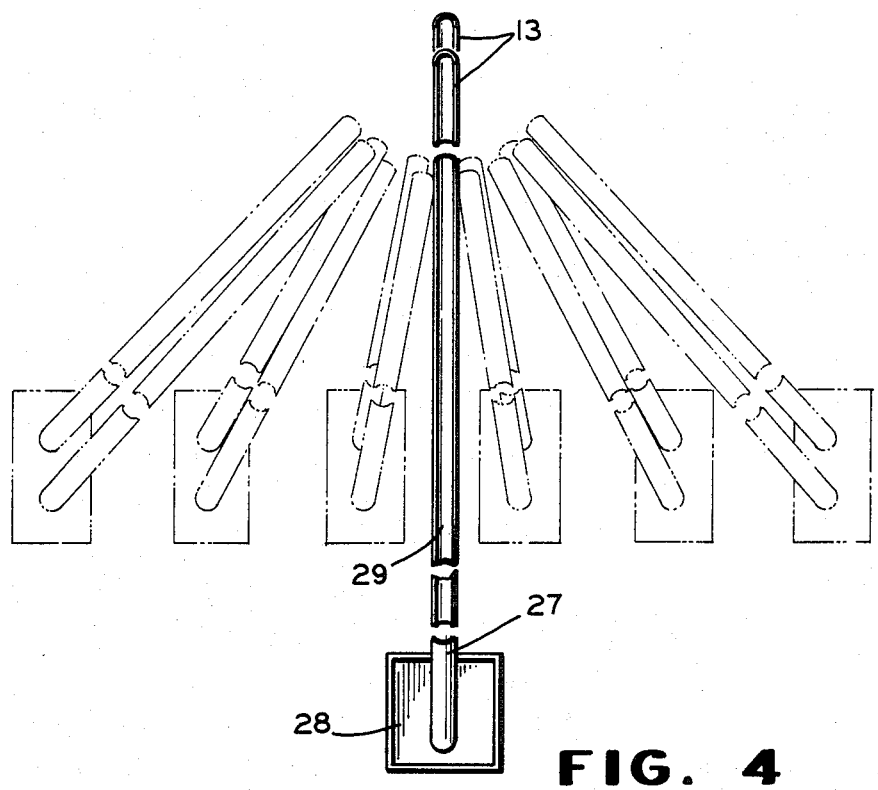
FIG. 4 is a schematic plan view of the apparatus of FIG. 3.

With particular reference to FIGS. 3 and 4, a second embodiment of the reject system of the invention is illustrated with like numerals being applied to elements found also in FIGS. 1 and 2. In this embodiment, however, the cullet chute 28 is shown positioned beyond the machine conveyor 35, and the deflector chutes 27 are positioned at the ends of fairly long troughs 29, as compared to the troughs shown in FIG. 1. However, the apparatus functions and operates essentially the same in that, when it is desired to reject gobs and not deliver the gobs to a particular section and to take that machine section out of operation, the deflector scoop 13 will move to and register with the upper ends of the troughs 29 and thereby deliver the rejected gobs to the cullet chute 28. In some installations, it is advantageous to provide the cullet chute at a position out from under the machine feeding apparatus, whereas in other installations, the existing cullet chutes may actually be installed and in position beneath the feeding position, and the embodiment of FIG. 1 would most readily lend itself to use in such a situation.

The gob feeder, of course, operates at regular intervals to feed gobs of glass, and the timing of nearly all the other operations on the forming machine are related to the feeder timing. Therefore, when it is required to take a section out of operation, the gobs which are to be fed to that section will be deflected by the scoop mechanism to the cullet chute rather than the section. While the reject chute is shown at the central location where there is perhaps more room to fit the extra set of troughs and deflectors than between other sets of troughs, it should also be remembered that a central location is advantageous when considering that in the normal firing order it is the closest location possible to all of the delivery troughs. The scoops must be oscillated to the central position in order to reject the gobs, and the time to move the scoops between shear cuts is not a very long time in which to permit the scoops to swing from their previous position to the reject position and stop.

While the foregoing description is primarily in conjunction with a double gob feeder for a six section glass forming machine, it should be apparent that the reject system would have equal application to the most productive, 10 section, quadruple cavity glass forming machines now being used.

I claim:

1. In apparatus for delivering gobs to plural sections of a glass forming machine wherein gob distributing scoops are positioned with their upper ends in alignment with feeder orifices of a glass gob feeder with means for oscillating said scoops about the axes of the feeder orifices to deliver gobs to a plurality of set of troughs each leading to one of a plurality of machine sections positioned therebelow, the improvement comprising a pair of deflector chutes extending from the path of sweep of the delivery end of said scoops to a cullet chute and means connected to said means for oscillating said scoops for selectively moving said scoops into alignment with said deflector chutes to reject gobs in sequence away from a selected machine section upon command.

2. The apparatus of claim 1 wherein said cullet chute is positioned beyond the row of machine sections and the conveyor and said deflector chutes extend over the machine sections and the conveyor.

3. The apparatus of claim 1 wherein said cullet chute is positioned beneath said feeder adjacent the parison side of the machine sections and said deflector chutes each are in the form of an angular deflector extending from the path of travel of the end of the scoops to the upper end of the cullet chute.

4. The apparatus of claim 1 wherein said deflector chutes are comprised of sets of a plurality of chutes of the same number as the scoops.

5. The apparatus of claim 1 wherein said oscillating means for indexing said scoops comprises an electrical servo motor and said means connected to said oscillating means for selectively indexing said scoops into alignment with said deflector chutes comprises a selector switch.

6. In apparatus for distributing plural gobs to a series of glass forming machine sections positioned in a row therebelow, wherein the gob distributor comprises a set of oscillatable scoops whose upper ends are in alignment with the feeder orifices and their lower ends move through an arc and are indexed into alignment with plural sets of throughs extending to the forming machine sections, the improvement therein comprising a servo motor connected to drive the scoops in a preselected sequence to deliver the gobs to the sections in a predetermined order, a cullet chute adjacent said forming machine sections, a set of deflector chutes in addition to said plural sets of troughs, said deflector chutes extending from the arc of the scoops' lower end to said cullet chute and positioned with said scoop upper ends at the middle of the arc of said scoops' lower ends whereby gobs to be rejected are intercepted by the scoops when positioned in alignment with said deflector chutes.

* * * * *